US012551742B1

(12) United States Patent
Hood et al.

(10) Patent No.: US 12,551,742 B1
(45) Date of Patent: Feb. 17, 2026

(54) DUAL STAGE FIRE SPRINKLER HEAD AND FIRE SUPPRESSION SYSTEM

(71) Applicant: HDK Fire Innovations, LLC, Rockwall, TX (US)

(72) Inventors: Justin Hood, Rockwall, TX (US); Jeremy Harris, LaRue, TX (US); Zane Krempin, Celina, TX (US); Albert Carr, Merritt Island, FL (US); Russ Taylor, Micco, FL (US)

(73) Assignee: HDK Innovations, LLC, Rockwall, TX (US)

( * ) Notice: Subject to any disclaimer, the term of this patent is extended or adjusted under 35 U.S.C. 154(b) by 0 days.

(21) Appl. No.: 19/264,556

(22) Filed: Jul. 9, 2025

(51) Int. Cl.
*A62C 37/14* (2006.01)
*A62C 37/21* (2006.01)

(52) U.S. Cl.
CPC .............. *A62C 37/14* (2013.01); *A62C 37/21* (2013.01)

(58) Field of Classification Search
CPC ......... A62C 37/11; A62C 37/12; A62C 37/14; A62C 37/16; A62C 37/38
USPC .................................. 169/37, 38, 39, 56–58
See application file for complete search history.

(56) References Cited

U.S. PATENT DOCUMENTS 3,757,866 A * 9/1973 Mears ..................... F16K 17/38 169/37
3,924,687 A * 12/1975 Groos .................... A62C 37/08 169/37
4,553,602 A * 11/1985 Pieczykolan .......... A62C 37/12 169/90
5,533,576 A * 7/1996 Mears .................... A62C 37/20 169/38
6,073,700 A * 6/2000 Tsuji ...................... A62C 37/16 169/90
11,547,888 B2 * 1/2023 Meyer .................. F16K 31/465

* cited by examiner

*Primary Examiner* — Steven J Ganey
(74) *Attorney, Agent, or Firm* — Scheef & Stone, LLP; Mark D. Nielsen; Mike Schofield

(57) ABSTRACT

Systems and methods are disclosed that include providing a dual stage fire sprinkler in a fire suppression system. The dual stage fire sprinkler includes an activation system and a dual stage sealing assembly having a primary frangible bulb and a secondary frangible bulb. The fire sprinkler activates a first stage fire suppression operation in response to an ambient temperature in a zone exceeding a trigger temperature of the primary frangible bulb. The activation system automatically replaces the primary frangible bulb with the secondary frangible bulb after a predetermined period of time and either activates a second stage fire suppression operation in response to the ambient temperature exceeding the trigger temperature of the secondary frangible bulb or resets the fire sprinkler for a subsequent fire hazard event in response to the ambient temperature being lower than the trigger temperature of the secondary frangible bulb.

30 Claims, 6 Drawing Sheets

DUAL STAGE FIRE SPRINKLER HEAD AND FIRE SUPPRESSION SYSTEM

BACKGROUND

Automatic fire suppression (sprinkler) systems are used in both commercial and residential structures and are currently required by law to be installed in all new commercial and high-rise residential buildings. Many older commercial and residential structures are also being retrofitted with these systems, for both safety measures and to secure adequate insurance coverage at reasonable premiums. Traditional automatic fire suppression systems generally include one or more sprinkler heads disposed in each protected building space such as a room, a loft, a lobby, or the like. The sprinkler heads are connected to a water distribution pipe and automatically activate in response to detection of fire to begin flowing water into the space to suppress the fire. These traditional systems operate continuously to provide fire suppression until local fire department can be activated and arrive to provide full fire suppression efforts and/or manually shut off the flow of at the main pump or via an external tool.

Current automatic sprinkler heads often suppress a fire within the first few minutes and use approximately 40 to 60 gallons of water. Even if the fire is suppressed by the sprinkler in the first few minutes, current automatic sprinkler heads will continue to distribute water into the affected space at a rate of 20 to 30 gallons per minute. By the time, the local fire department is dispatched to the site of the fire and arrives to confirm the fire is suppressed or under control, an additional 15 to 20 minutes may have passed, resulting in a total of over 400 gallons of water dispersed into the space. The result is a significant amount of unnecessary water damage to the affected space and often to many adjacent areas or spaces of the structure that were unaffected by the original fire, resulting in a significant financial ripple effect on building owners, tenants, or the like. For these reasons, there is an increasing demand for technological advances in fire suppression systems that are capable of quickly suppressing a fire, minimizing water usage, and significantly reducing or eliminating unnecessary water damage after the fire has been suppressed or controlled.

BRIEF DESCRIPTION OF THE DRAWINGS

For a more complete understanding of the present disclosure and so that the manner in which the features and advantages of the embodiments can be understood in more detail, reference is now made to the following brief description, taken in connection with the accompanying drawings and detailed description.

The use of the same reference symbols in different drawings indicates similar or identical items.

DETAILED DESCRIPTION

Figure 1:
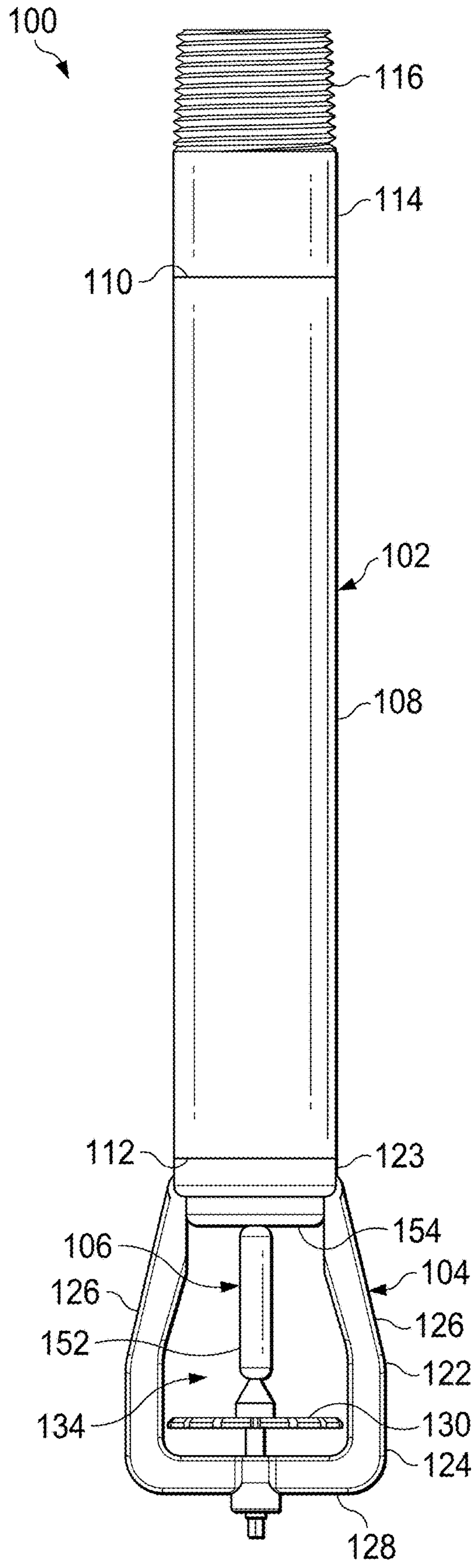
FIG. 1 shows an orthogonal side view of a dual stage fire sprinkler head according to an embodiment of the disclosure.
Figure 2:
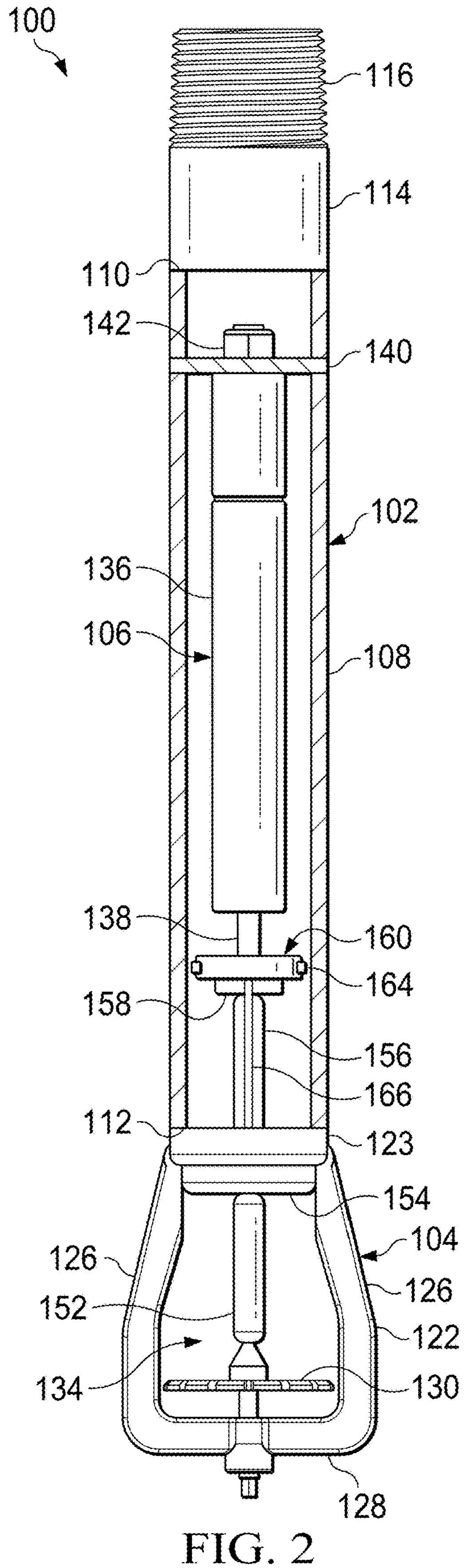
FIG. 2 shows a partial cross-sectional side view of the dual stage fire sprinkler head according to an embodiment of the disclosure.
Figure 3:
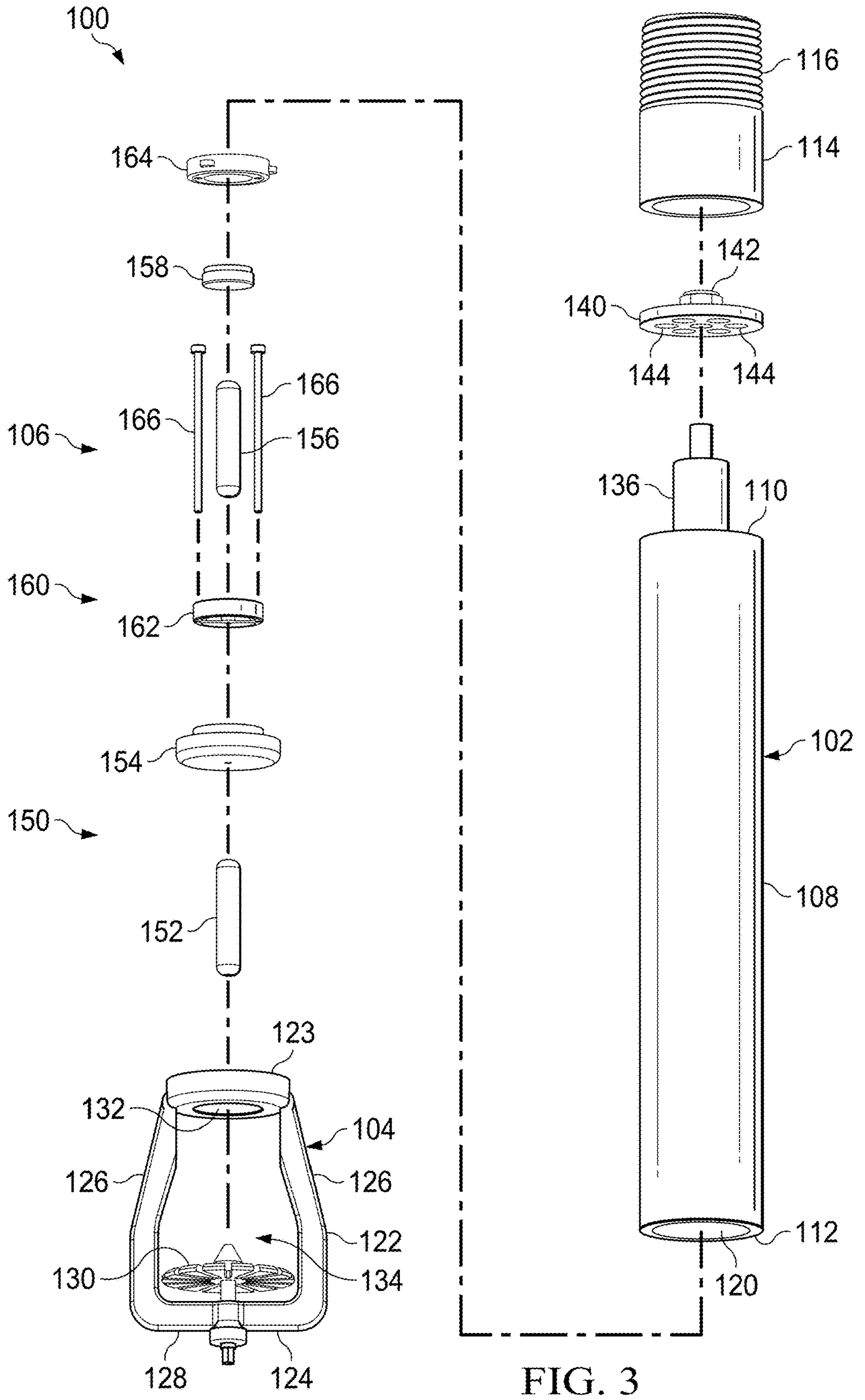
FIG. 3 shows an oblique exploded view of the dual stage fire sprinkler head according to an embodiment of the disclosure.

Referring to FIGS. 1 to 3, an orthogonal side view, a partial cross-sectional side view, and an oblique exploded view of a dual stage fire sprinkler head 100 is shown according to an embodiment of the disclosure. The sprinkler head 100 may generally comprise a housing 102, a deflector assembly 104, and a dual stage activation assembly 106. The housing 102 may comprise a substantially cylindrical-shaped body 108 having a proximate end 110 and a distal end 112. The proximate end 110 of the housing 102 may comprise a threaded fitting 114 and/or threaded portion 116 configured to threadably attach the sprinkler head 100 to a branch fitting of a fire suppression system, such as fire suppression system 500 in FIG. 5, which is designed and configured to carry and deliver a fluid (e.g., water in a so-called “wet pipe system”) or gas (e.g., nitrogen in a so-called “dry pipe system”) to the sprinkler head 100. In some embodiments, the threaded fitting 114 and/or threaded portion 116 may comprise male threads that threadably attach the sprinkler head 100 to a female branch fitting of the fire suppression system. In some embodiments, the threaded fitting 114 and/or threaded portion 116 may comprise female threads that threadably attach the sprinkler head 100 to a male branch fitting of the fire suppression system. The distal end 112 of the housing 102 may be configured to threadably or permanently attach or couple to the deflector assembly 104. The housing 102 may also be configured to carry and/or house the dual stage activation assembly 106 within an internal bore 120 of the housing 102.

The deflector assembly 104 may generally comprise a body 122 comprising a threaded portion 123 that may be threadably or permanently coupled to the distal end 112 of the housing 102. The body 122 of the deflector assembly 104 may also comprise a frame 124 comprising one or more pairs of opposing support legs 126 extending from the threaded portion 123 that join at a base 128 of the body 122. The deflector assembly 104 may also comprise a deflector 130 that may be secured to the base 128 of the body 122. In some embodiments, the deflector 130 may be threadably coupled to the base 128. In some embodiments, the deflector 130 may be secured to the base by a fastener, such as a screw or rivet. The deflector assembly 104 may also comprise a central bore or aperture 132 extending through the body 122 that allows a flow of a fluid therethrough. The aperture 132 may connect the internal bore 120 of the housing 102 in fluid communication to allow a fluid to flow through the internal bore 120 of the housing 102, through the aperture 132 of the deflector assembly 104, and to an opening 134, where fluid flowing through the sprinkler head 100 may exit the sprinkler head 100 and contact the deflector 130 to radially disperse the fluid into the room or zone in which the sprinkler head 100 is installed or located.

The dual stage activation assembly 106 may generally be at least partially carried within and/or by the housing 102. The dual stage activation assembly 106 may comprise an actuation mechanism 136 comprising a selectively extendable and retractable shaft or actuation rod 138. The actuation mechanism 136 may generally comprise a spring-loaded, hydraulic mechanism (e.g., a speed limiter). The actuation mechanism 136 may be configured such that when pressure is released from the actuation rod 138, the spring in the actuation mechanism 136 operates to automatically extend the actuation rod 138 at a predetermined rate of extension, which is regulated and/or resisted by the viscous fluid within the actuation mechanism 136. In some embodiments, the predetermined rate of extension of the actuation rod 138 of the actuation mechanism 136 may be selectively adjustable and/or controlled, such that extension of the actuation rod 138 after activation lasts a predetermined period of time.

The actuation mechanism 136 may be coupled to a mounting plate 140 and secured to the mounting plate 140 by a fastener 142, such as a nut, that threadably attaches to a proximal end of the actuation mechanism 136 that extends through a hole 144 in the mounting plate 140. The mounting plate 140 may be coupled and/or secured to the housing 102, such that the actuation mechanism 136 remains stationary with respect to the housing 102. The mounting plate may also comprise a plurality of holes 144 that extend through the mounting plate 140 to allow a fluid to flow through the holes 144 in the mounting plate 140 and through the internal bore 120 of the housing 102, through the aperture 132 of the deflector assembly 104, and to the opening 134, where the fluid may be radially disperse by the deflector 130 into the room or zone in which the sprinkler head 100 is installed or located. In some embodiments, the plurality of holes 144 may comprise a predetermined cross-sectional area to ensure the holes 144 provide adequate fluid flow through the mounting plate 140. However, in some embodiments, it may be desirable to restrict the fluid flow through the mounting plate 140 to provide a desired flow rate through the sprinkler head 100.

The dual stage activation assembly 106 may also comprise a dual stage sealing assembly 150. The dual stage sealing assembly 150 may be configured to control the flow of fluid through the sprinkler head 100. More specifically, the dual stage sealing assembly 150 may be configured to activate the flow of fluid (first stage) through the sprinkler head 100 in response to detection of a fire hazard, reseal the sprinkler head 100 after providing the flow of fluid in the first stage for a predetermined time period, and then reactivate the flow of fluid (second stage) through the sprinkler head 100 in response to detection that the fire hazard was not controlled or mitigated by the first stage of the flow of fluid. In response to determining that the fire hazard was controlled or mitigated by the first stage of the flow of fluid, the second stage of fluid flow would not be activated and the dual stage sealing assembly 150 would prevent the fluid flow through the sprinkler head 100 to prevent the waste of water and/or unnecessary water damage caused by traditional sprinkler heads that require manual shutoff to the sprinkler heads.

The dual stage sealing assembly 150 may comprise a primary sealing assembly comprising a primary frangible bulb 152 and a primary seal 154. The dual stage sealing assembly 150 may also comprise a secondary sealing assembly comprising a secondary frangible bulb 156 and a secondary seal 158. The dual stage sealing assembly 150 may also comprise a cage assembly 160 that is disposed at a distal end of the actuation rod 138. The cage assembly 160 may generally be configured to carry the secondary sealing assembly and move the secondary sealing assembly into operational position in response to activation of the primary sealing assembly and subsequent linear extension of the actuation rod 138. In some embodiments, the cage assembly 160 may comprise a lower plate 162, and upper plate 164, and a plurality of connecting rods 166 that connect the lower plate 162 to the upper plate 164 to form the cage assembly 160. In some embodiments, the second sealing assembly, namely the secondary frangible bulb 156 and the secondary seal 158 may be captured between the lower plate 162 and the upper plate 164, such that the cage assembly 160 may carry the secondary sealing assembly. In some embodiments, the connecting rods 166 may be fasteners, such as machine screws that couple the lower plate 162 to the upper plate 164. It will be appreciated that both the lower plate 162 and the upper plate 164 may comprise one or more apertures to allow fluid flow therethrough and/or may comprise diameters smaller than an inner diameter of the internal bore 120 of the housing 102 to allow fluid flow around each of the plates 162, 164.

When assembled, the actuation rod 138, the primary frangible bulb 152, the primary seal 154, the secondary frangible bulb 156, and the secondary seal 158 may be coaxially or linearly aligned. The primary frangible bulb 152 may be disposed between the deflector 130 and the primary seal 154. In some embodiments, the cage assembly 160 may be disposed adjacent to the primary seal 154. The secondary frangible bulb 156 may be disposed between the lower plate 162 and the secondary seal 158 and in contact with the lower plate 162. The secondary seal 158 may be disposed adjacent to and in contact with the upper plate 164, and the upper plate 164 may be coupled to the actuation rod 138 of the actuation mechanism 136. In this manner, the dual stage sealing assembly 150 comprises a stacked sealing assembly that activates in two separate stages, with the first sealing assembly comprising the primary frangible bulb 152 and the primary seal 154 disposed between the cage assembly 160 and the deflector 130, and the secondary sealing assembly comprising the secondary frangible bulb 156 and the secondary seal 158 may be disposed between the lower plate 162 and the upper plate 164 and carried by the cage assembly 160 into operational position in response to activation of the primary sealing assembly.

The primary frangible bulb 152 and the secondary frangible bulb 156 may each comprise a glass ampule filled with a glycerin-based liquid that expands when heated, thereby causing a frangible bulb 152, 156 to rupture when exposed to extreme temperatures. The frangible bulbs 152, 156 may comprise a trigger mechanism for the flow of fluid through the sprinkler head 100. As such, when the ambient temperature in the room or zone in which the sprinkler head 100 is installed or located exceeds a trigger temperature associated with the frangible bulb 152, 156, the frangible bulb 152, 156 may rupture and initiate the flow of fluid through the sprinkler head 100. In some embodiments, the frangible bulbs 152, 156 may comprise the same trigger temperature. However, in some embodiments, the frangible bulbs 152, 156 may comprise different trigger temperatures. In some embodiments, the liquid in the frangible bulbs 152, 156 may also be color coded based on the trigger temperature. In some embodiments, the trigger temperature may be 135 degrees Fahrenheit (57 degrees Celsius) having an orange color, 155 degrees Fahrenheit (68 degrees Celsius) having a red color, 175 degrees Fahrenheit (79 degrees Celsius) having a yellow color, 200 degrees Fahrenheit (93 degrees Celsius) having a green color, 286 degrees Fahrenheit (141 degrees Celsius) having a blue color, 360 degrees Fahrenheit (182 degrees Celsius) having a purple color, or 440 degrees Fahrenheit (227 degrees Celsius) having a black color.

Further, in some embodiments, the frangible bulbs 152, 156 may comprise a diameter of 2 millimeters (mm), 3 mm, 4 mm, or even 5 mm.

The frangible bulbs 152, 156 may generally be configured to be disposed adjacent to and/or in contact with their associated seals 154, 158 and seat against the deflector 130. This configuration keeps the frangible bulbs 152, 156 oriented vertically with respect to the sprinkler head 100. When one of the frangible bulbs 152, 156 is seated against the deflector 130, the associated or respective seal 154, 158 may be configured to form a fluid tight seal with the aperture 132 extending through the body 122 of the deflector assembly 104 to prevent fluid from flowing through the sprinkler head 100. In some embodiments, the seals 154, 158 may slightly deflect or deform when inserted into the aperture 132 to form the fluid tight seal. Accordingly, in some embodiments, the seals 154, 158 may be from a polymeric, elastomeric, or metallic material. When the associated or respective bulb 152, 156 ruptures in response to the ambient temperature exceeding the trigger temperature, the seal 154, 158 may drop from the aperture 132 to open a fluid flowpath (from a branch fitting of a fire suppression system 500, through housing 102 and aperture 132, and through the opening 134 when radially deflected by the deflector 130) through the sprinkler head 100.

Figure 5:
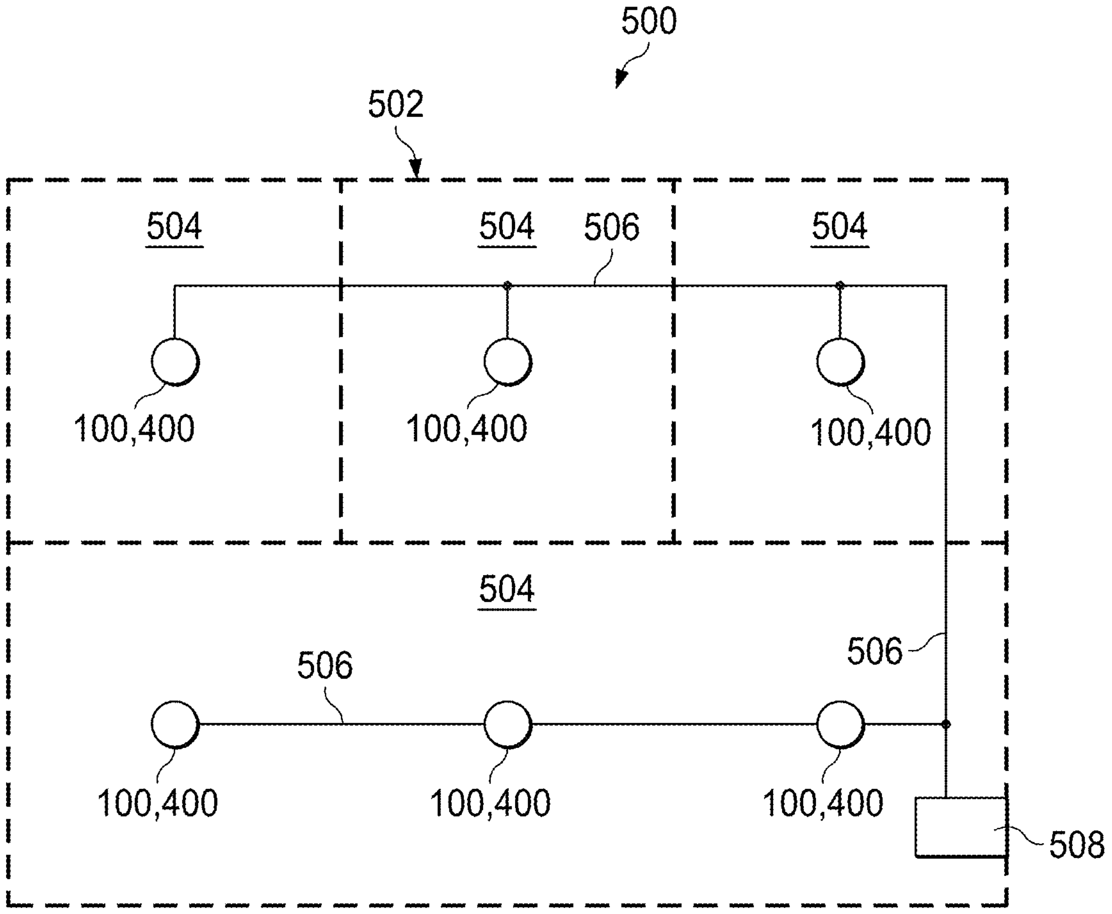
FIG. 5 shows a simplified schematic diagram of a fire suppression system comprising a plurality of dual stage fire sprinkler heads according to an embodiment of the disclosure.

Still referring to FIGS. 1 to 3, in operation, the sprinkler head 100 may be connected to a branch fitting of a fire suppression system, such as fire suppression system 500 in FIG. 5. The primary sealing assembly comprising the primary frangible bulb 152 and the primary seal 154 may form a fluid tight seal with the aperture 132 of the body 122 of the deflector assembly 104. When the ambient temperature in a room or zone in which the sprinkler head 100 is located or installed exceeds the trigger temperature of the primary frangible bulb 152, the primary frangible bulb 152 may rupture, causing the primary seal 154 to be forced out of the aperture 132 of the body 122 to activate the flow of fluid through the sprinkler head 100 in the first stage.

In the first stage, the flow of fluid through the sprinkler head 100 in the first stage may continue for a predetermined period of time. This predetermined period of time may be determined by the characteristics (e.g., spring strength, hydraulic properties) of the actuation mechanism 136 in the dual stage activation assembly 106. More specifically, the predetermined time period may be determined by the amount of time it takes the actuation rod 138 to drive the secondary sealing assembly into the aperture 132 and stop the flow of fluid through the sprinkler head 100, which may be selectively adjustable or predetermined by the actuation mechanism 136. In some embodiments, the predetermined time period may be at least 1 minute, at least 2 minutes, at least 3 minutes, at least 4 minutes, at least 5 minutes, or even at least 10 minutes. In some embodiments, the predetermined time period may be between 2 and 5 minutes, or even between 2 and 3 minutes. However, in some embodiments, the predetermined time period may be designed and/or set for any of the above-referenced absolute values, such as about 2 minutes, about 2 minutes and 30 seconds, or even about 3 minutes.

Once the secondary sealing assembly is driven into the aperture 132 by extension of the actuation rod 138 and movement of the cage assembly 160, the secondary seal 158 may form a fluid tight seal with the aperture 132 to stop the flow of fluid through the sprinkler head 100. This completes the first stage of fire suppression. If the ambient temperature in the room or zone in which the sprinkler head 100 is installed or located exceeds the trigger temperature of the secondary frangible bulb 156, which is now seated within the cage assembly 160 and against the base 128 of the body 122 and/or the deflector 130, the secondary frangible bulb 156 may rupture, causing the secondary seal 158 to be forced out of the aperture 132 of the body 122 of the deflector assembly 104 to reactivate the flow of fluid through the sprinkler head 100 in the second stage. In the second stage, the flow of fluid through the sprinkler head 100 may continue indefinitely until the water is shut off at the main pump within the building or with an external tool at the sprinkler head itself by a responding municipality, such as the local fire department, which is the current protocol in many municipalities.

In traditional automatic fire sprinkler systems, only a single stage activation is used. These systems operate continuously to provide fire suppression until the local fire department can be activated and arrive to provide full fire suppression efforts and/or manually shut off the flow of at the main pump or via an external tool. Typically, a fire can be suppressed within the first few minutes, which distributes approximately 40 to 60 gallons of water in that time, but traditional systems continue to distribute water into the affected space at a rate of 20 to 30 gallons per minute, which can result in over 400 gallons of water dispersed into the space. The result is a significant amount of unnecessary water damage to the affected space and often to many adjacent areas or spaces of the structure that were unaffected by the original fire, resulting in a significant financial ripple effect on building owners, tenants, or the like.

However, the dual stage activation assembly 106 operates to automatically replace the primary sealing assembly comprising the primary frangible bulb 152 and the primary seal 154 after the predetermined time period with the secondary sealing assembly comprising the secondary frangible bulb 156 and the secondary seal 158 (which is carried by the cage assembly into the operational position for the second stage) to provide automated fire suppression. Thus, the sprinkler head 100 may be automatically reset after the predetermined time period by inserting the secondary frangible bulb 156 and the secondary seal 158 into position. This allows the sprinkler head 100 an opportunity to extinguish the fire hazard in the first stage of operation, with the ability to reassess the fire hazard and either: remain shut off due to the fire hazard being sufficiently suppressed or extinguished; or reactivate the second stage flow of fluid in response to the ambient temperature in the room or zone still exceeding the trigger temperature of the secondary frangible bulb 156, which is indicative that the fire hazard was not sufficiently suppressed or extinguished during the first stage.

During the second stage, the flow of fluid will continue until the water is shut off at the main pump within the building or with an external tool at the sprinkler head itself by a responding municipality, such as the local fire department. Not only does the sprinkler head 100 allow for the conservation of water in response to suppressing or extinguishing the fire hazard in the first stage, but it eliminates the collateral damage (e.g., unnecessary water damage to the affected space and adjacent areas or spaces of the structure that were unaffected by the original fire) often caused by traditional automatic fire sprinkler systems that operate continuously once activated. Further, while the sprinkler head 100 is disclosed as comprising a dual stage sealing assembly 150 comprising a primary sealing assembly and a secondary sealing assembly, in some embodiments, the sprinkler head 100 may comprise additional sealing assemblies or stages, such as a third sealing assembly, which may function to replace the secondary sealing assembly in accordance with the methods disclosed herein and in the same manner in which the primary sealing assembly is replaced with the secondary sealing assembly.

Figure 4:
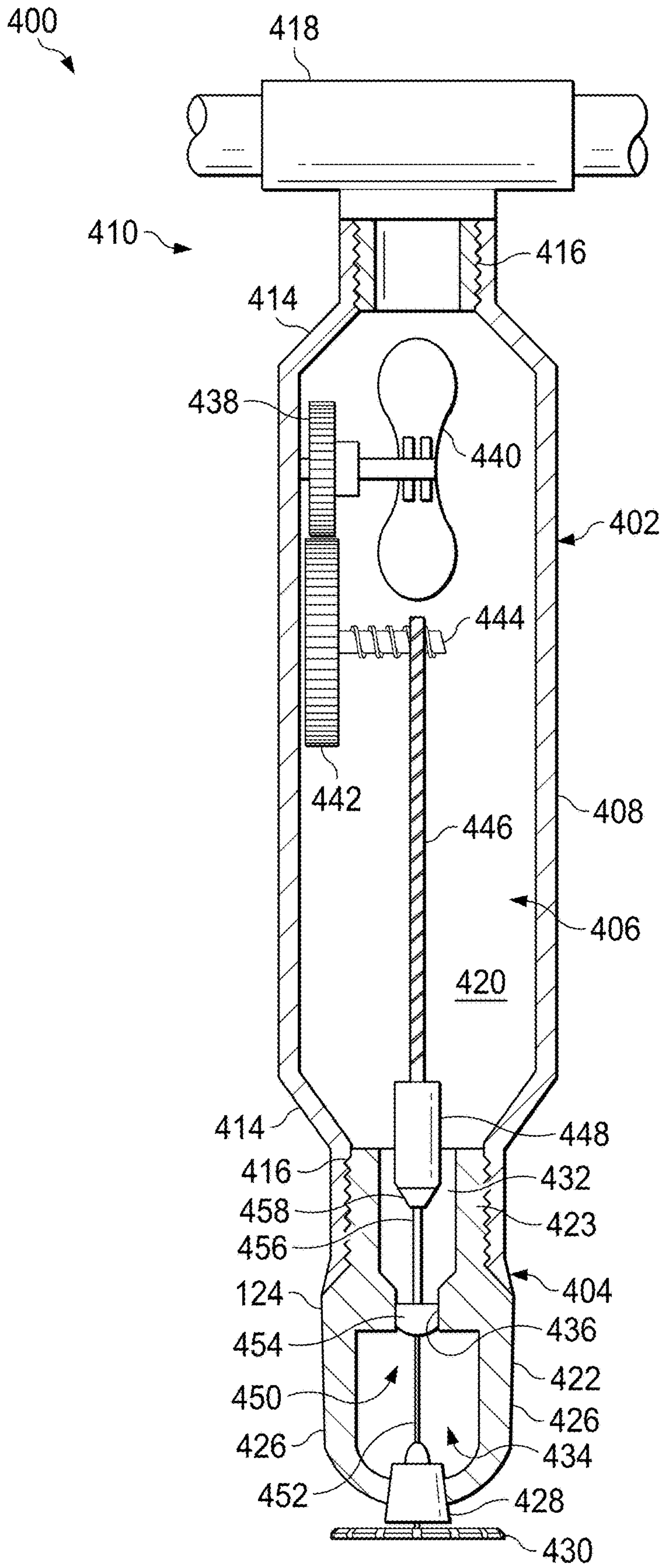
FIG. 4 shows a partial cross-sectional side view of a dual stage fire sprinkler head according to another embodiment of the disclosure.

Referring to FIG. 4, a cross-sectional side view of a dual stage fire sprinkler head 400 is shown according to another embodiment of the disclosure. The sprinkler head 400 may generally comprise a housing 402, a deflector assembly 404, and a dual stage activation assembly 406. The housing 402 may comprise a substantially cylindrical-shaped body 408. Each end 410, 412 of the housing 402 may comprise a frustoconical, tapered portion 414 that is frustoconical in shape and that tapers to an internally threaded fitting 416. The proximate end 410 of the housing 402 may be configured to threadably attach to a branch fitting 418 of a fire suppression system, such as fire suppression system 500 in FIG. 5 that carries and delivers a fluid (e.g., water in a so-called "wet pipe system") or gas (e.g., nitrogen in a so-called "dry pipe system") to the sprinkler head 400. In some embodiments, depending on the configuration, the threaded fitting 416 may comprise male threads that threadably attaches to a female threaded fitting 416. The distal end 412 of the housing 402 may be configured to threadably attach to the deflector assembly 404. The housing 402 may also be configured to carry and/or house the dual stage activation assembly 406 within an internal bore 420 of the housing 402.

The deflector assembly 404 may generally comprise a body 422 comprising a threaded portion 423 that may be threadably coupled to the threaded fitting 416 disposed at the distal end 412 of the housing 402. The body 422 of the deflector assembly 404 may also comprise a frame 424 comprising one or more pairs of opposing support legs 426 extending from the threaded portion 423 that join at a base 428 of the body 422. The deflector assembly 404 may also comprise a deflector 430 that may be secured to the base 428 of the body 422. In some embodiments, the deflector 430 may be threadably coupled to the base 428. In some embodiments, the deflector 430 may be secured to the base by a fastener, such as a screw or rivet.

The deflector assembly 404 may also comprise a central bore or aperture 432 extending through the body 422 that allows a flow of a fluid therethrough. The aperture 432 may connect the internal bore 420 of the housing 402 in fluid communication to allow a fluid to flow through the internal bore 420 of the housing 402, through the aperture 432 of the deflector assembly 404, and to an opening 434, where fluid flowing through the sprinkler head 400 may exit the sprinkler head 400 and contact the deflector 430 to radially disperse the fluid into the room or zone in which the sprinkler head 400 is stationed or installed. In some embodiments, the aperture 432 may comprise a reduced diameter sealing seat 436 that cooperates with the dual stage activation assembly 406 to control the flow of fluid through the sprinkler head 400 in each of a first stage and a second stage.

The dual stage activation assembly 406 may generally be carried within the housing 402. The dual stage activation assembly 406 may comprise a first gear 438. The first gear 438 may comprise and/or be coupled to a paddle wheel 440. The paddle wheel 440 may comprise a plurality of paddles that are configured to cause the first gear 438 to rotate in response to a fluid flowing through the housing 402 and contacting the paddle wheel 440. In other embodiments, the first gear 438 may comprise any other suitable device that rotates the first gear 438 in response to a fluid flow through the housing 402.

The dual stage activation assembly 406 may also comprise a second gear 442. The second gear 442 may be engaged with the first gear 438, such that rotation of the first gear 438 causes the second gear 442 to also rotate. Accordingly, each of the first gear 438 and the second gear 442 may comprise spur gears. The second gear 442 may comprise and/or be coupled to a worm gear 444 or other suitable mechanism that converts rotational motion into linear motion. The worm gear 444 may comprise and/or be coupled to an actuation rod 446. Accordingly, rotation of the second gear 442 (caused by rotation of the first gear 438 in response to a fluid flow through the housing 402) may cause the actuation rod 446 to move linearly. In some embodiments, components of the dual stage activation assembly 406 may be combined such that the paddle wheel 440 and the worm gear 444 may be coupled to a single device that allows rotation of the paddle wheel 440 to translate linear motion into the actuation rod 446. Further, in some embodiments, the dual stage activation assembly 406 may comprise additional components or gears to facilitate translating linear motion into the actuation rod 446. As will be discussed later herein, the linear motion of the actuation rod 446 may activate a dual stage sealing assembly 450 during operation of the sprinkler head 400.

The dual stage activation assembly 406 may also comprise a dual stage sealing assembly 450. The dual stage sealing assembly 450 may be configured to control the flow of fluid through the sprinkler head 400. More specifically, the dual stage sealing assembly 450 may be configured to activate the flow of fluid (first stage) through the sprinkler head 400 in response to detection of a fire hazard, reseal the sprinkler head 400 after providing the flow of fluid in the first stage for a predetermined time period, and then reactivate the flow of fluid (second stage) through the sprinkler head in response to detection that the fire hazard was not controlled or mitigated by the first stage of the flow of fluid.

The dual stage sealing assembly 450 may comprise a primary sealing assembly comprising a primary frangible bulb 452 and a primary seal 454. The dual stage sealing assembly 450 may also comprise a secondary sealing assembly comprising a secondary frangible bulb 456 and a secondary seal 458. The dual stage sealing assembly 450 may be disposed at a distal end of the actuation rod 446, which may optionally comprise a seal plug 448. The secondary seal 458 may be coupled to and/or carried by the actuator rod 446, with the secondary frangible bulb 456 coupled to and extending forwardly therefrom. The primary seal 454 may be coupled to and/or carried by the secondary bulb 456, with the primary frangible bulb 452 coupled to and extending forwardly therefrom. In this manner, the dual stage sealing assembly 450 comprises a stacked sealing assembly that activates in two separate stages.

The primary frangible bulb 452 and the secondary frangible bulb 456 may each comprise a glass ampule filled with a glycerin-based liquid that expands when heated, thereby causing a frangible bulb 452, 456 to rupture when exposed to extreme temperatures. The frangible bulbs 452, 456 may comprise a trigger mechanism for the flow of fluid through the sprinkler head 400. As such, when the ambient temperature in the room or zone in which the sprinkler head 400 is stationed or installed exceeds a trigger temperature associated with the frangible bulb 452, 456, the frangible bulb 452, 456 may rupture and initiate the flow of fluid through the sprinkler head 400. In some embodiments, the frangible bulbs 452, 456 may comprise the same trigger temperature. However, in some embodiments, the frangible bulbs 452, 456 may comprise different trigger temperatures. In some embodiments, the liquid in the frangible bulbs 452, 456 may also be color coded based on the trigger temperature. In some embodiments, the trigger temperature may be 135 degrees Fahrenheit (57 degrees Celsius) having an orange color, 155 degrees Fahrenheit (68 degrees Celsius) having a red color, 175 degrees Fahrenheit (79 degrees Celsius) having a yellow color, 200 degrees Fahrenheit (93 degrees Celsius) having a green color, 286 degrees Fahrenheit (141 degrees Celsius) having a blue color, 360 degrees Fahrenheit (182 degrees Celsius) having a purple color, or 440 degrees Fahrenheit (227 degrees Celsius) having a black color. Further, in some embodiments, the frangible bulbs 452, 456 may comprise a diameter of 2 millimeters (mm), 3 mm, 4 mm, or even 5 mm.

The frangible bulbs 452, 456 may generally be configured to extend from their associated seal 454, 458 and seat on the base 428 of the body 422 and/or the deflector 430. This configuration keeps the frangible bulbs 452, 456 oriented vertically with respect to the sprinkler head 400. When one of the frangible bulbs 452, 456 is seated in the base 428 of the body 422 and/or the deflector 430, the associated or respective seal 454, 458 may be configured to form a fluid tight seal with the sealing seat 436 to prevent fluid from flowing through the sprinkler head 400. In some embodiments, the seals 454, 458 may slightly deflect or deform when inserted into the sealing seat 436 to form the fluid tight seal. Accordingly, in some embodiments, the seals 454, 458 may be from a polymeric, elastomeric, or metallic material. When the associated or respective bulb 452, 456 ruptures in response to the ambient temperature exceeding the trigger temperature, the seal 454, 458 may drop from the aperture 432 to open a fluid flowpath (from a branch fitting 418 of a fire suppression system 500, through housing 402 and aperture 432, and through opening 434 when radially deflected by deflector 430) through the sprinkler head 400.

Still referring to FIG. 4, in operation, the sprinkler head 400 may be connected to a branch fitting 418 of a fire suppression system, such as fire suppression system 500 in FIG. 5. The primary sealing assembly comprising the primary frangible bulb 452 and the primary seal 454 may form a fluid tight seal with the sealing seat 436 of the body 422 of the deflector assembly 404. When the ambient temperature in a room or zone in which the sprinkler head 400 is located or installed exceeds the trigger temperature of the primary frangible bulb 452, the primary frangible bulb 452 may rupture, causing the primary seal 454 to be forced out of the aperture 432 of the body 422 to activate the flow of fluid through the sprinkler head 400 in the first stage.

In the first stage, the flow of fluid through the sprinkler head 400 in the first stage may continue for a predetermined period of time. This predetermined period of time may be determined by the gearing in the dual stage activation assembly 406. More specifically, the predetermined time period may be determined by the amount of time it takes the paddle wheel 440 to rotate, while driven by the flow of fluid, and impart rotational motion to the second gear 442 to cause linear motion in the actuation rod 446 sufficient to drive the secondary sealing assembly into the sealing seat 436 and stop the flow of fluid through the sprinkler head 400. In some embodiments, the predetermined time period may be at least 1 minute, at least 2 minutes, at least 3 minutes, at least 4 minutes, at least 5 minutes, or even at least 10 minutes. In some embodiments, the predetermined time period may be between 2 and 5 minutes, or even between 2 and 3 minutes. However, in some embodiments, the predetermined time period may be designed and/or set for any of the above-referenced absolute values, such as about 2 minutes, about 2 minutes and 30 seconds, or even about 3 minutes.

Once the secondary sealing assembly is driven into the sealing seat 436, the secondary seal 458 may form a fluid tight seal with the sealing seat 436 to stop the flow of fluid through the sprinkler head 400. This completes the first stage of fire suppression. If the ambient temperature in the room or zone in which the sprinkler head 400 is located or installed exceeds the trigger temperature of the secondary frangible bulb 456, which is now seated in the base 428 of the body 422 and/or the deflector 430, the secondary frangible bulb 456 may rupture, causing the secondary seal 458 to be forced out of the aperture 432 of the body 422 to reactivate the flow of fluid through the sprinkler head 400 in the second stage. In the second stage, the flow of fluid through the sprinkler head 400 may continue indefinitely until the water is shut off at the main pump within the building or with an external tool at the sprinkler head itself by a responding municipality, such as the local fire department, which is the current protocol in many municipalities.

In traditional automatic fire sprinkler systems, only a single stage activation is used. These systems operate continuously to provide fire suppression until local fire department can be activated and arrive to provide full fire suppression efforts and/or manually shut off the flow of at the main pump or via an external tool. Typically, a fire can be suppressed within the first few minutes, which distributes approximately 40 to 60 gallons of water in that time, but traditional systems continue to distribute water into the affected space at a rate of 20 to 30 gallons per minute, which can result in over 400 gallons of water dispersed into the space. The result is a significant amount of unnecessary water damage to the affected space and often to many adjacent areas or spaces of the structure that were unaffected by the original fire, resulting in a significant financial ripple effect on building owners, tenants, or the like.

However, the dual stage activation assembly 406 operates to automatically replace the primary sealing assembly comprising the primary frangible bulb 452 and the primary seal 454 after the predetermined time period with the secondary sealing assembly comprising the secondary frangible bulb 456 and the secondary seal 458. Thus, the sprinkler head 400 may be automatically reset after the predetermined time period by inserting the frangible bulb 456 and the secondary seal 458 into position. This allows the sprinkler head 400 an opportunity to extinguish the fire hazard in the first stage of operation, with the ability to reassess the fire hazard and either: remain shut off due to the fire hazard being sufficiently suppressed or extinguished; or reactivate the second stage flow of fluid in response to the ambient temperature in the room or zone still exceeding the trigger temperature of the secondary frangible bulb 456, which is indicative that the fire hazard was not sufficiently suppressed or extinguished during the first stage.

During the second stage, the flow of fluid will continue until the water is shut off at the main pump within the building or with an external tool at the sprinkler head itself by a responding municipality, such as the local fire department. Not only does the sprinkler head 400 allow for the conservation of water in response to suppressing or extinguishing the fire hazard in the first stage, but it eliminates the collateral damage (e.g., unnecessary water damage to the affected space and adjacent areas or spaces of the structure that were unaffected by the original fire) often caused by traditional automatic fire sprinkler systems that operate continuously. Further, while the sprinkler head 400 is disclosed as comprising a dual stage sealing assembly 450 comprising a primary sealing assembly and a secondary sealing assembly, in some embodiments, the sprinkler head 400 may comprise additional sealing assemblies or stages, such as a third sealing assembly, which may function to replace the secondary sealing assembly in accordance with the methods disclosed herein.

It will be appreciated that the sprinkler heads 100, 400 disclosed herein provide automated, dual stage fire suppression. The sprinkler heads 100, 400 operate to autonomously replace the primary sealing assembly with the secondary sealing assembly after a predetermined time period, which is determined by the characteristics and components of the sprinkler heads 100, 400. The sprinkler heads 100, 400 may also comprise a robust construction that prevents or resists activation due to inadvertent contact and/or tampering. Further, it will be appreciated that the sprinkler heads 100, 400 do not require an electronic control system to activate the first stage of fire suppression, replace the primary sealing assembly with the secondary sealing assembly, or activate the second stage of fire suppression. However, it is within the scope of this disclosure to provide electronically activated fire sprinkler heads 100, 400 that include electronic components configured to activate the first stage of fire suppression, replace the primary sealing assembly with the secondary sealing assembly, activate the second stage of fire suppression, or a combination thereof.

Referring to FIG. 5, a simplified schematic diagram of a fire suppression system 500 comprising a plurality of dual stage fire sprinkler heads 100, 400 is shown according to an embodiment of the disclosure. The fire suppression system 500 may generally be installed in a structure 502 comprising one or more rooms, sections, or zones 504. In some embodiments, the structure 502 may be a residential dwelling, commercial building, or the like. One or more sprinkler heads 100, 400 may be installed in each zone 504 of the structure 502. In some embodiments, the number of sprinkler heads 100, 400 in each zone 504 may be determined by local or federal fire code. Each sprinkler head 100, 400 may be connected to a fluid conduit 506 that may be coupled to and fed by a main water supply 508. Each sprinkler head 100, 400 may also operate independently. Thus, if a fire hazard is detected in one zone 504, one or more sprinkler heads 100, 400 in that particular zone 504 may be activated or triggered in the first stage fire suppression efforts.

However, if a fire spreads to other zones 504, one or more sprinkler heads 100, 400 in those other zones 504 may also be activated or triggered in the first stage fire suppression operation. If the fire hazard is sufficiently suppressed or extinguished, the one or more activated sprinkler heads 100, 400 may function as described above and automatically stop the flow of fluid into the zone 504. This may preserve electronics, sensitive documents, and other contents of the zone as well as the structural integrity and cosmetic features of the zone and/or the structure or building. However, if the fire hazard is not sufficiently suppressed or extinguished, the second stage fire suppression operation. As stated, the sprinkler heads 100, 400 may be suitable for wet pipe systems or dry pipe systems and be useful for reducing water consumption during fire suppression operations as well as reducing or altogether reducing collateral damage caused by traditional automatic sprinkler systems.

Figure 6:
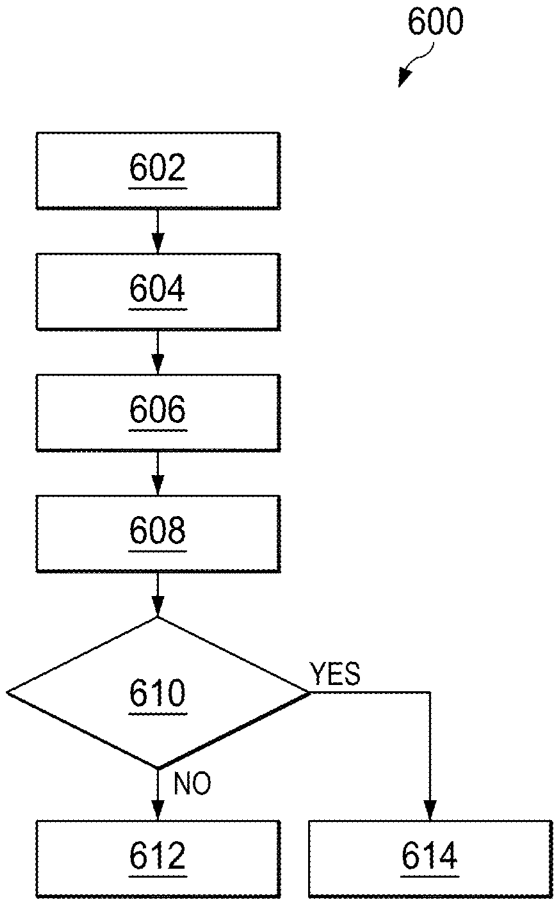
FIG. 6 shows a flowchart of a method of operating a fire suppression system according to an embodiment of the disclosure.

Referring to FIG. 6, a flowchart of a method 600 of operating a fire suppression system 500 comprising one or more dual stage fire sprinkler heads 100, 400 is shown according to an embodiment of the disclosure. The method 600 may begin at block 602 by providing one or more fire sprinkler heads 100, 400 in a zone 504 of a structure 502 associated with a fire suppression system 500. The method 600 may continue at block 604 by detecting a fire hazard and initiating a first stage fire suppression operation comprising flowing a fluid through the sprinkler head 100, 400. In some embodiments, the first stage fire suppression operation may begin in response to an ambient temperature in the zone 504 exceeding a trigger temperature of a first frangible bulb 152, 452.

The method 600 may continue at block 606 by operating the system for predetermined time period. In some embodiments, the predetermined period of time may be determined by characteristics (e.g., spring strength, hydraulic properties) of the actuation mechanism 136 or the gearing in a dual stage activation assembly 106, 406 of the sprinkler head 100, 400. In some embodiments, the predetermined time period may be determined by the amount of time it takes the actuation rod 138 to drive the secondary sealing assembly into the aperture 132 and stop the flow of fluid through the sprinkler head 100. In some embodiments, the predetermined time period may be determined by the amount of time it takes a paddle wheel 440 to rotate, while driven by the flow of fluid, and impart rotational motion to a second gear 442 to cause linear motion in an actuation rod 446 sufficient to drive the secondary sealing assembly into a sealing seat 436 of an aperture 432 of a deflector assembly 404 and stop the flow of fluid through the sprinkler head 400. The method 600 may continue at block 608 by stopping the flow of fluid through the sprinkler head 100, 400. In some embodiments, the flow of fluid through the sprinkler head 100 may be stopped by an actuation rod 138 driving a secondary sealing assembly into the aperture 132 by extension of the actuation rod 138 and movement of the cage assembly 160 caused by the actuation mechanism 136 where the secondary seal 158 forms a fluid tight seal with the aperture 132 to stop the flow of fluid through the sprinkler head 100. In some embodiments, the flow of fluid through the sprinkler head 400 may be stopped by a dual stage activation assembly 406 driving a secondary sealing assembly comprising a secondary frangible bulb 456 and a secondary seal 458 into position where the secondary frangible bulb 456 seats on a base 428 of a body 422 and/or a deflector 430 of a deflector assembly 404.

The method 600 may continue at block 610 by determining whether the fire hazard has been suppressed or extinguished. The method may optionally continue at block 612 by automatically restricting the flow of fluid through the sprinkler head 100, 400 in response to determining the fire hazard has been suppressed or extinguished in block 610 of the method 600. In some embodiments, the fire hazard may be determined to be suppressed or extinguished in response to an ambient temperature in the zone 504 being below the trigger threshold of the secondary frangible bulb 156, 456. The method 600 may optionally continue at block 614 by reactivating the flow of fluid through the sprinkler head 100, 400 in response to determining the fire hazard has not been suppressed or extinguished in block 610 of the method 600. In some embodiments, the fire hazard may be determined to have not been suppressed or extinguished in response to an ambient temperature in the zone 504 exceeding the trigger threshold of the secondary frangible bulb 156, 456, thereby causing the secondary frangible bulb 156, 456 to rupture. In some embodiments, the flow of fluid through the sprinkler head 100, 400 may thereafter continue indefinitely.

Embodiments

It will be appreciated that embodiments of a dual stage fire sprinkler head 100, 400, a fire suppression system 500, or a method 600 of operating a fire suppression system 500 may include one or more of the following embodiments:

Embodiment 1. A fire sprinkler head, comprising: a housing comprising an internal bore; a deflector assembly coupled to a distal end of the housing and comprising a body, an aperture formed in the body and in fluid communication with the internal bore of the housing, and a deflector; and a dual stage activation assembly comprising an actuation mechanism disposed within the internal bore of the housing and comprising a selectively extendable actuation rod, a primary sealing assembly comprising a primary frangible bulb and a primary seal, and a secondary sealing assembly comprising a secondary frangible bulb and a secondary seal.

Embodiment 2. The fire sprinkler head of claim 1, wherein the proximate end of the housing comprises a threaded fitting, threaded portion, or a combination thereof configured to threadably attach the fire sprinkler head to a branch fitting of a fire suppression system.

Embodiment 3. The fire sprinkler head of claim 1, wherein the deflector is configured to radially disperse a fluid flowing from the internal bore of the housing and through the aperture through one or more openings in the body of the deflector assembly.

Embodiment 4. The fire sprinkler head of claim 1, wherein the actuation mechanism is fixed with respect to the housing, and wherein the selectively extendable actuation rod is configured to extend at a predetermined rate of extension, for a predetermined period of time, or a combination thereof.

Embodiment 5. The fire sprinkler head of claim 1, wherein the actuation mechanism, the primary frangible bulb, the primary seal, the secondary frangible bulb, and the secondary seal are coaxially aligned.

Embodiment 6. The fire sprinkler head of claim 5, wherein the primary frangible bulb is disposed between the deflector and the primary seal.

Embodiment 7. The fire sprinkler head of claim 6, wherein the dual stage sealing assembly comprises a cage assembly is disposed at a distal end of the actuation rod and rearwardly from the primary seal, and wherein the cage assembly is configured to carry the secondary frangible bulb and the secondary seal into an operational position in response to activation of the primary sealing assembly and subsequent extension of the actuation rod.

Embodiment 8. The fire sprinkler head of claim 7, wherein the dual stage sealing assembly comprises a linearly stacked sealing assembly that activates in two separate stages.

Embodiment 9. The fire sprinkler head of claim 1, wherein the dual stage activation assembly is configured to activate a first stage flow of fluid through the fire sprinkler head in response to the fire sprinkler head initially detecting a fire hazard.

Embodiment 10. The fire sprinkler head of claim 9, wherein the fire sprinkler head is configured to initially detect a fire hazard in response to an ambient temperature where the fire sprinkler head is located exceeding a trigger temperature of the primary frangible bulb.

Embodiment 11. The fire sprinkler head of claim 10, wherein the primary frangible bulb is configured to rupture in response to the ambient temperature where the fire sprinkler head is located exceeding a trigger temperature of the primary frangible bulb.

Embodiment 12. The fire sprinkler head of claim 11, wherein the dual stage activation assembly is configured to automatically reseal the fire sprinkler head with the secondary sealing assembly by the actuation rod of the actuation mechanism linearly driving the secondary sealing assembly into an operational position to stop the first stage flow of fluid through the fire sprinkler head after activating the first stage flow of fluid through the fire sprinkler head for a predetermined period of time.

Embodiment 13. The first sprinkler head of claim 12, wherein the dual stage activation assembly is configured to activate a second stage flow of fluid through the fire sprinkler head in response to the fire sprinkler head detecting that the fire hazard was not controlled by the first stage of the flow of fluid through the fire sprinkler head.

Embodiment 14. The fire sprinkler head of claim 13, wherein the fire sprinkler head is configured to detect that the fire hazard was not controlled by the first stage of the flow of fluid through the fire sprinkler head in response to an ambient temperature where the fire sprinkler head is located exceeding a trigger temperature of the secondary frangible bulb.

Embodiment 15. The fire sprinkler head of claim 14, wherein the secondary frangible bulb is configured to rupture in response to the ambient temperature where the fire sprinkler head is located exceeding a trigger temperature of the secondary frangible bulb.

Embodiment 16. The fire sprinkler head of claim 13, wherein the dual stage activation assembly is configured to not activate the second stage flow of fluid through the fire sprinkler head in response to the fire sprinkler head detecting that the fire hazard was controlled by the first stage of the flow of fluid through the fire sprinkler head.

Embodiment 17. The fire sprinkler head of claim 1, wherein the primary frangible bulb and the secondary frangible bulb comprise a glass ampule filled with a glycerin-based liquid that expands when heated, thereby causing each of the primary frangible bulb and the secondary frangible bulb to rupture when an ambient temperature exceeds a trigger temperature.

Embodiment 18. The fire sprinkler head of claim 17, wherein the primary frangible bulb and the secondary frangible bulb comprise the same trigger temperature.

Embodiment 19. The fire sprinkler head of claim 17, wherein the primary frangible bulb and the secondary frangible bulb comprise different trigger temperatures.

Embodiment 20. The fire sprinkler head of claim 17, wherein the trigger temperature of the primary frangible bulb and the secondary frangible bulb are selected from the list of trigger temperatures consisting of: 135 degrees Fahrenheit (57 degrees Celsius), 155 degrees Fahrenheit (68 degrees Celsius), 175 degrees Fahrenheit (79 degrees Celsius), 200 degrees Fahrenheit (93 degrees Celsius), 286 degrees Fahrenheit (141 degrees Celsius), 360 degrees Fahrenheit (182 degrees Celsius), and 440 degrees Fahrenheit (227 degrees Celsius) having a black color.

Embodiment 21. The fire sprinkler head of claim 1, wherein the dual stage activation assembly operates to automatically replace the primary sealing assembly with the secondary sealing assembly after a first stage flow of fluid is activated through the fire sprinkler head for a predetermined period of time.

Embodiment 22. The fire sprinkler of claim 21, wherein the sprinkler head comprises at least one additional sealing assembly that automatically replaces the secondary sealing assembly after a second stage flow of fluid is activated through the fire sprinkler head for a predetermined period of time.

Embodiment 23. A fire suppression system, comprising: a water source; a conduit system coupled to the water source; and a plurality of sprinkler heads coupled to the conduit system and configured to receive a flow of fluid from the water source through the conduit system and selectively disperse the fluid, each of the sprinkler heads comprising: a housing comprising an internal bore; a deflector assembly coupled to a distal end of the housing and comprising a body, an aperture formed in the body and in fluid communication with the internal bore of the housing, and a deflector; and a dual stage activation assembly comprising an actuation mechanism disposed within the internal bore of the housing and comprising a selectively extendable actuation rod, a primary sealing assembly comprising a primary frangible bulb and a primary seal, and a secondary sealing assembly comprising a secondary frangible bulb and a secondary seal.

Embodiment 24. The fire suppression system of claim 23, wherein the dual stage activation assembly is configured to activate a first stage flow of fluid through the fire sprinkler head in response to the fire sprinkler head initially detecting a fire hazard.

Embodiment 25. The fire sprinkler head of claim 24, wherein the dual stage activation assembly is configured to automatically reseal the fire sprinkler head with the secondary sealing assembly by the actuation rod of the actuation mechanism linearly driving the secondary sealing assembly into an operational position to stop the first stage flow of fluid through the fire sprinkler head after activating the first stage flow of fluid through the fire sprinkler head for a predetermined period of time.

Embodiment 26. The first sprinkler head of claim 25, wherein the dual stage activation assembly is configured to activate a second stage flow of fluid through the fire sprinkler head in response to the fire sprinkler head detecting that the fire hazard was not controlled by the first stage of the flow of fluid through the fire sprinkler head.

Embodiment 27. The fire sprinkler head of claim 26, wherein the dual stage activation assembly is configured to not activate the second stage flow of fluid through the fire sprinkler head in response to the fire sprinkler head detecting that the fire hazard was controlled by the first stage of the flow of fluid through the fire sprinkler head.

Embodiment 28. The fire suppression system of claim 23, wherein the fire suppression system is installed in a structure comprising a plurality of zones, and wherein at least one of the plurality of sprinkler heads is installed in each of the plurality of zones of the structure.

Embodiment 29. A method of operating a fire suppression system, comprising: providing a fire suppression system comprising a water source, a conduit system coupled to the water source, and a plurality of sprinkler heads coupled to the conduit system and configured to receive a flow of fluid from the water source through the conduit system and selectively disperse the fluid, each of the sprinkler heads comprising: a housing comprising an internal bore; a deflector assembly coupled to a distal end of the housing and comprising a body, an aperture formed in the body and in fluid communication with the internal bore of the housing, and a deflector; and a dual stage activation assembly comprising an actuation mechanism disposed within the internal bore of the housing and comprising a selectively extendable actuation rod, a primary sealing assembly comprising a primary frangible bulb and a primary seal, and a secondary sealing assembly comprising a secondary frangible bulb and a secondary seal; activating a first stage flow of fluid through a first fire sprinkler head of the plurality of fire sprinkler heads in response to the first fire sprinkler head detecting a fire hazard; automatically resealing the first fire sprinkler head with the secondary sealing assembly of the first fire sprinkler head by the actuation rod of the actuation mechanism of the first fire sprinkler linearly driving the secondary sealing assembly of the first fire sprinkler head into an operational position to stop the first stage flow of fluid through the first fire sprinkler head after activating the first stage flow of fluid through the first fire sprinkler head for a predetermined period of time; and selectively (1) activating a second stage flow of fluid through the first fire sprinkler head in response to the first fire sprinkler head detecting that the fire hazard was not controlled by the first stage of the flow of fluid through the first fire sprinkler head or (2) not activating the second stage flow of fluid through the first fire sprinkler head in response to the first fire sprinkler head detecting that the fire hazard was controlled by the first stage of the flow of fluid through the first fire sprinkler head.

Embodiment 30. The method of claim 29, wherein the first fire sprinkler head is located in a first zone, wherein a second fire sprinkler head of the plurality of sprinkler heads is located in a second zone different from the first zone, the method further comprising: activating a first stage flow of fluid through the second fire sprinkler head of the plurality of fire sprinkler heads in response to the second fire sprinkler head detecting the fire hazard; automatically resealing the second fire sprinkler head with the secondary sealing assembly of the second fire sprinkler head by the actuation rod of the actuation mechanism of the second fire sprinkler head linearly driving the secondary sealing assembly of the second fire sprinkler head into an operational position to stop the first stage flow of fluid through the second fire sprinkler head after activating the first stage flow of fluid through the second fire sprinkler head for a predetermined period of time; and selectively (1) activating a second stage flow of fluid through the second fire sprinkler head in response to the second fire sprinkler head detecting that the fire hazard was not controlled by the first stage of the flow of fluid through the second fire sprinkler head or (2) not activating the second stage flow of fluid through the second fire sprinkler head in response to the second fire sprinkler head detecting that the fire hazard was controlled by the first stage of the flow of fluid through the second fire sprinkler head.

In the foregoing specification, the concepts have been described with reference to specific embodiments. However, those of ordinary skill in the art appreciate that various modifications and changes can be made without departing from the scope of the invention as set forth in the claims below. Other examples that occur to those skilled in the art are intended to be within the scope of the claims if they have structural elements that do not differ from the literal language of the claims, or if they include equivalent structural elements with insubstantial differences from the literal languages of the claims. Accordingly, the specification and figures are to be regarded in an illustrative rather than in a restrictive sense, and all such modifications are intended to be included within the scope of the invention.

Benefits, other advantages, and solutions to problems have been described above with respect to one or more specific embodiments. After reading the specification, those of ordinary skill in the art will appreciate that certain features that are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range and include sub-ranges that overlap from one preferred range to another preferred range.

What is claimed is:

1. A fire sprinkler head, comprising:

a housing comprising an internal bore;

a deflector assembly coupled to a distal end of the housing and comprising a body, an aperture formed in the body and in fluid communication with the internal bore of the housing, and a deflector; and a dual stage activation assembly comprising an actuation mechanism disposed within the internal bore of the housing and comprising a selectively extendable actuation rod, a primary sealing assembly comprising a primary frangible bulb and a primary seal, and a secondary sealing assembly comprising a secondary frangible bulb and a secondary seal.

2. The fire sprinkler head of claim 1, wherein the proximate end of the housing comprises a threaded fitting, threaded portion, or a combination thereof configured to threadably attach the fire sprinkler head to a branch fitting of a fire suppression system.

3. The fire sprinkler head of claim 1, wherein the deflector is configured to radially disperse a fluid flowing from the internal bore of the housing and through the aperture through one or more openings in the body of the deflector assembly.

4. The fire sprinkler head of claim 1, wherein the actuation mechanism is fixed with respect to the housing, and wherein the selectively extendable actuation rod is configured to extend at a predetermined rate of extension, for a predetermined period of time, or a combination thereof.

5. The fire sprinkler head of claim 1, wherein the actuation mechanism, the primary frangible bulb, the primary seal, the secondary frangible bulb, and the secondary seal are coaxially aligned.

6. The fire sprinkler head of claim 5, wherein the primary frangible bulb is disposed between the deflector and the primary seal.

7. The fire sprinkler head of claim 6, wherein the dual stage sealing assembly comprises a cage assembly is disposed at a distal end of the actuation rod and rearwardly from the primary seal, and wherein the cage assembly is configured to carry the secondary frangible bulb and the secondary seal into an operational position in response to activation of the primary sealing assembly and subsequent extension of the actuation rod.

8. The fire sprinkler head of claim 7, wherein the dual stage sealing assembly comprises a linearly stacked sealing assembly that activates in two separate stages.

9. The fire sprinkler head of claim 1, wherein the dual stage activation assembly is configured to activate a first stage flow of fluid through the fire sprinkler head in response to the fire sprinkler head initially detecting a fire hazard.

10. The fire sprinkler head of claim 9, wherein the fire sprinkler head is configured to initially detect a fire hazard in response to an ambient temperature where the fire sprinkler head is located exceeding a trigger temperature of the primary frangible bulb.

11. The fire sprinkler head of claim 10, wherein the primary frangible bulb is configured to rupture in response to the ambient temperature where the fire sprinkler head is located exceeding a trigger temperature of the primary frangible bulb.

12. The fire sprinkler head of claim 11, wherein the dual stage activation assembly is configured to automatically reseal the fire sprinkler head with the secondary sealing assembly by the actuation rod of the actuation mechanism linearly driving the secondary sealing assembly into an operational position to stop the first stage flow of fluid through the fire sprinkler head after activating the first stage flow of fluid through the fire sprinkler head for a predetermined period of time.

13. The first sprinkler head of claim 12, wherein the dual stage activation assembly is configured to activate a second stage flow of fluid through the fire sprinkler head in response to the fire sprinkler head detecting that the fire hazard was not controlled by the first stage of the flow of fluid through the fire sprinkler head.

14. The fire sprinkler head of claim 13, wherein the fire sprinkler head is configured to detect that the fire hazard was not controlled by the first stage of the flow of fluid through the fire sprinkler head in response to an ambient temperature where the fire sprinkler head is located exceeding a trigger temperature of the secondary frangible bulb.

15. The fire sprinkler head of claim 14, wherein the secondary frangible bulb is configured to rupture in response to the ambient temperature where the fire sprinkler head is located exceeding a trigger temperature of the secondary frangible bulb.

16. The fire sprinkler head of claim 13, wherein the dual stage activation assembly is configured to not activate the second stage flow of fluid through the fire sprinkler head in response to the fire sprinkler head detecting that the fire hazard was controlled by the first stage of the flow of fluid through the fire sprinkler head.

17. The fire sprinkler head of claim 1, wherein the primary frangible bulb and the secondary frangible bulb comprise a glass ampule filled with a glycerin-based liquid that expands when heated, thereby causing each of the primary frangible bulb and the secondary frangible bulb to rupture when an ambient temperature exceeds a trigger temperature.

18. The fire sprinkler head of claim 17, wherein the primary frangible bulb and the secondary frangible bulb comprise the same trigger temperature.

19. The fire sprinkler head of claim 17, wherein the primary frangible bulb and the secondary frangible bulb comprise different trigger temperatures.

20. The fire sprinkler head of claim 17, wherein the trigger temperature of the primary frangible bulb and the secondary frangible bulb are selected from the list of trigger temperatures consisting of: 135 degrees Fahrenheit (57 degrees Celsius), 155 degrees Fahrenheit (68 degrees Celsius), 175 degrees Fahrenheit (79 degrees Celsius), 200 degrees Fahrenheit (93 degrees Celsius), 286 degrees Fahrenheit (141 degrees Celsius), 360 degrees Fahrenheit (182 degrees Celsius), and 440 degrees Fahrenheit (227 degrees Celsius) having a black color.

21. The fire sprinkler head of claim 1, wherein the dual stage activation assembly operates to automatically replace the primary sealing assembly with the secondary sealing assembly after a first stage flow of fluid is activated through the fire sprinkler head for a predetermined period of time.

22. The fire sprinkler of claim 21, wherein the sprinkler head comprises at least one additional sealing assembly that automatically replaces the secondary sealing assembly after a second stage flow of fluid is activated through the fire sprinkler head for a predetermined period of time.

23. A fire suppression system, comprising:

a water source;

a conduit system coupled to the water source; and a plurality of sprinkler heads coupled to the conduit system and configured to receive a flow of fluid from the water source through the conduit system and selectively disperse the fluid, each of the sprinkler heads comprising:

a housing comprising an internal bore;

a deflector assembly coupled to a distal end of the housing and comprising a body, an aperture formed in the body and in fluid communication with the internal bore of the housing, and a deflector; and a dual stage activation assembly comprising an actuation mechanism disposed within the internal bore of the housing and comprising a selectively extendable actuation rod, a primary sealing assembly comprising a primary frangible bulb and a primary seal, and a secondary sealing assembly comprising a secondary frangible bulb and a secondary seal.

24. The fire suppression system of claim 23, wherein the dual stage activation assembly is configured to activate a first stage flow of fluid through the fire sprinkler head in response to the fire sprinkler head initially detecting a fire hazard.

25. The fire suppression system of claim 24, wherein the dual stage activation assembly is configured to automatically reseal the fire sprinkler head with the secondary sealing assembly by the actuation rod of the actuation mechanism linearly driving the secondary sealing assembly into an operational position to stop the first stage flow of fluid through the fire sprinkler head after activating the first stage flow of fluid through the fire sprinkler head for a predetermined period of time.

26. The fire suppression system of claim 25, wherein the dual stage activation assembly is configured to activate a second stage flow of fluid through the fire sprinkler head in response to the fire sprinkler head detecting that the fire hazard was not controlled by the first stage of the flow of fluid through the fire sprinkler head.

27. The fire suppression system of claim 26, wherein the dual stage activation assembly is configured to not activate the second stage flow of fluid through the fire sprinkler head in response to the fire sprinkler head detecting that the fire hazard was controlled by the first stage of the flow of fluid through the fire sprinkler head.

28. The fire suppression system of claim 23, wherein the fire suppression system is installed in a structure comprising a plurality of zones, and wherein at least one of the plurality of sprinkler heads is installed in each of the plurality of zones of the structure.

29. A method of operating a fire suppression system, comprising:

providing a fire suppression system comprising a water source, a conduit system coupled to the water source, and a plurality of sprinkler heads coupled to the conduit system and configured to receive a flow of fluid from the water source through the conduit system and selectively disperse the fluid, each of the sprinkler heads comprising: a housing comprising an internal bore; a deflector assembly coupled to a distal end of the housing and comprising a body, an aperture formed in the body and in fluid communication with the internal bore of the housing, and a deflector; and a dual stage activation assembly comprising an actuation mechanism disposed within the internal bore of the housing and comprising a selectively extendable actuation rod, a primary sealing assembly comprising a primary frangible bulb and a primary seal, and a secondary sealing assembly comprising a secondary frangible bulb and a secondary seal;

activating a first stage flow of fluid through a first fire sprinkler head of the plurality of fire sprinkler heads in response to the first fire sprinkler head detecting a fire hazard;

automatically resealing the first fire sprinkler head with the secondary sealing assembly of the first fire sprinkler head by the actuation rod of the actuation mechanism of the first fire sprinkler linearly driving the secondary sealing assembly of the first fire sprinkler head into an operational position to stop the first stage flow of fluid through the first fire sprinkler head after activating the first stage flow of fluid through the first fire sprinkler head for a predetermined period of time; and selectively (1) activating a second stage flow of fluid through the first fire sprinkler head in response to the first fire sprinkler head detecting that the fire hazard was not controlled by the first stage of the flow of fluid through the first fire sprinkler head or (2) not activating the second stage flow of fluid through the first fire sprinkler head in response to the first fire sprinkler head detecting that the fire hazard was controlled by the first stage of the flow of fluid through the first fire sprinkler head.

30. The method of claim 29, wherein the first fire sprinkler head is located in a first zone, wherein a second fire sprinkler head of the plurality of sprinkler heads is located in a second zone different from the first zone, the method further comprising:

activating a first stage flow of fluid through the second fire sprinkler head of the plurality of fire sprinkler heads in response to the second fire sprinkler head detecting the fire hazard; and automatically resealing the second fire sprinkler head with the secondary sealing assembly of the second fire sprinkler head by the actuation rod of the actuation mechanism of the second fire sprinkler head linearly driving the secondary sealing assembly of the second fire sprinkler head into an operational position to stop the first stage flow of fluid through the second fire sprinkler head after activating the first stage flow of fluid through the second fire sprinkler head for a predetermined period of time; and selectively (1) activating a second stage flow of fluid through the second fire sprinkler head in response to the second fire sprinkler head detecting that the fire hazard was not controlled by the first stage of the flow of fluid through the second fire sprinkler head or (2) not activating the second stage flow of fluid through the second fire sprinkler head in response to the second fire sprinkler head detecting that the fire hazard was controlled by the first stage of the flow of fluid through the second fire sprinkler head.

* * * * *